(12) United States Patent
Gonzalez-Lee

(10) Patent No.: US 11,872,523 B2
(45) Date of Patent: Jan. 16, 2024

(54) SELF-CONTAINED NITROGEN GENERATOR

(71) Applicant: MSS LASERS, Rugby (GB)

(72) Inventor: Carlos Gonzalez-Lee, Rugby (GB)

( * ) Notice: Subject to any disclaimer, the term of this patent is extended or adjusted under 35 U.S.C. 154(b) by 317 days.

(21) Appl. No.: 17/192,448

(22) Filed: Mar. 4, 2021

(65) Prior Publication Data

US 2021/0275963 A1  Sep. 9, 2021

Related U.S. Application Data

(60) Provisional application No. 62/985,148, filed on Mar. 4, 2020.

(51) Int. Cl.
*B01D 53/30* (2006.01)
*B01D 53/26* (2006.01)
*B01D 53/053* (2006.01)
*B01D 46/44* (2006.01)
*B01D 53/04* (2006.01)

(52) U.S. Cl.
CPC .......... *B01D 53/30* (2013.01); *B01D 46/446* (2013.01); *B01D 46/448* (2013.01); *B01D 53/0423* (2013.01); *B01D 53/0438* (2013.01); *B01D 53/053* (2013.01); *B01D 53/261* (2013.01); *B01D 2253/102* (2013.01); *B01D 2253/116* (2013.01); *B01D 2257/102* (2013.01); *B01D 2259/40088* (2013.01)

(58) Field of Classification Search
CPC ................ B01D 46/446; B01D 46/448; B01D 53/0423; B01D 53/0438; B01D 53/053; B01D 53/261; B01D 53/30
See application file for complete search history.

(56) References Cited

U.S. PATENT DOCUMENTS

2006/0278078 A1* 12/2006 Holt ..................... B01D 53/047
                                                                    95/138

FOREIGN PATENT DOCUMENTS

KR         2017034656 A  *  3/2017  ............. B01D 53/04

* cited by examiner

*Primary Examiner* — Sharon Pregler
(74) *Attorney, Agent, or Firm* — Panley Erickson & Swanson

(57) ABSTRACT

An apparatus and method for nitrogen production from compressed air. The apparatus is a portable compact unit including a compressed air input, a nitrogen generator configured to receive compressed air from a compressor through the compressed air input, a nitrogen storage vessel configured to store pressurized nitrogen, and a compressor failure monitor disposed between the compressed air input and the nitrogen generator. The compressor failure monitor can be in combination with an air dryer device, wherein the compressor failure monitor is configured to monitor a change in air pressure and/or air temperature at or from the air dryer, which can indicate compressor issues.

18 Claims, 4 Drawing Sheets

| NITROGEN PRODUCTION | SCFH | 459 | | 706 | | 1,059 | | 1,413 | | 1,766 | |
|---|---|---|---|---|---|---|---|---|---|---|---|
| NITROGEN PURITY | % | 99.9975 | 99.98 | 99.9975 | 99.98 | 99.9975 | 99.98 | 99.9975 | 99.98 | 99.975 | 99.98 |
| COMPRESSED AIR SUPPLY | SCFM | 45 | 38 | 72 | 55 | 109 | 84 | 148 | 117 | 179 | 161 |
| NITROGEN PRESSURE | PSI | 4,351 | | 4,351 | | 4,351 | | 4,351 | | 4,351 | |
| NITROGEN STORAGE | Ft³ | 5,085 | | 10,171 | | 10,171 | | 10,171 | | 10,171 | |
| DIMENSIONS (excluding storage) | In | 87 L x 95 W x 87 H | | | | | | | | | |

FIG. 5

SELF-CONTAINED NITROGEN GENERATOR

CROSS REFERENCE TO RELATED APPLICATION

This application claims the benefit of U.S. provisional application, Ser. No. 62/985,148, filed on 4 Mar. 2020. The provisional application is hereby incorporated by reference herein in its entirety and is made a part hereof, including but not limited to those portions which specifically appear hereinafter.

BACKGROUND OF THE INVENTION

This invention relates generally to nitrogen generation, and more particularly, to on-site nitrogen generation.

Laser cutting is a thermal machining process used for cutting metals. Laser cutting systems often use a nitrogen gas ($N_2$) source for high quality operation. Transporting and storing nitrogen can be an inefficient and expensive component to the cutting process. Systems for generating nitrogen typically involve large components and the need of height and floor space, which can be an issue for end users with limited floor space and height restrictions. In addition, a large danger for nitrogen generators is a sudden influx of oil from a failing air compressor. The typical protection against this is to install a real-time hydrocarbon (oil) detector, which is expensive (typically >$20,000).

There is continuing need for improved nitrogen sources and/or production.

SUMMARY OF THE INVENTION

A general object of the invention is to provide an improved nitrogen source, such as for laser cutting. A more specific objective of the invention is to overcome one or more of the problems described above.

The present invention provides a self-contained, plug-and-play nitrogen generation system suitable for industrial applications and which can be pre-set to suit the end user's specifications and needs. In embodiments of this invention, a bottom footprint of the portable compact unit comprises a longest length or width dimension of less than 100 inches, allowing for ease of shipping and installation.

Embodiments of this invention provide a nitrogen generation system that operates, using compressed air, at high psi, such as above 4000 psi, and desirably 4350 psi, whereas most nitrogen generators for laser application currently operate at 500 psi. This allows for a system that is significantly smaller, because it only needs to produce the average nitrogen production of the lasers rather than the peak production. This is typically a 4 to 1 ratio. The inlet pressure requirement for most laser machines is approximately 450 psi. The difference from 4350 to 450 psi is in the nitrogen storage. This means that to achieve the equivalent storage to modules of this invention, with 500 psi several 600 psi 1200 gallon vessels are needed, which have a large footprint and a cost 5-10 times larger than the solution of this invention.

The nitrogen generation systems of this invention use compressed air from a compressor, which is often separate from and connectable to the system. As discussed above compressor failure can damage the system, and currently requires expensive oil detection systems. Embodiments of this invention provide an external way to monitor potential oil carry over at a fraction of the cost. An indirect method according to embodiments of this invention monitors pressure and/or temperature at locations upstream of the nitrogen generator components, such as at or in a desiccant air dryer and filtration system, and uses this information for compressor failure detection.

The general object of the invention can be attained, at least in part, through an apparatus for nitrogen production from air. The apparatus includes a portable compact unit with a compressed air input, a nitrogen generator configured to receive compressed air from a compressor through the compressed air input, a nitrogen storage vessel configured to store pressurized nitrogen, and a compressor failure monitor disposed between the compressed air input and the nitrogen generator.

The invention further includes an apparatus for nitrogen production including a portable compact unit including a compressed air input, an air dryer configured to receive compressed air from a compressor through the compressed air input, a nitrogen generator, and a nitrogen storage vessel configured to store pressurized nitrogen. The apparatus further includes a compressor failure monitor in combination with the air dryer, wherein the compressor failure monitor is configured to monitor an air pressure and/or an air temperature at or from the air dryer.

In embodiments of this invention, the compressor failure monitor monitors a pressure and/or a temperature of the compressed air upstream of the nitrogen generator. A pressure drop and/or a temperature increase indicates a compressor failure.

A compressed air dryer is generally desirable between the compressed air input and the nitrogen generator, and the compressor failure monitor can be in detection combination with the compressed air dryer. A pressure drop and/or a temperature increase at the air dryer again indicates a compressor failure.

The compressed air dryer can include an air inlet with at least one replaceable filter, and the compressor failure monitor can monitor a pressure and/or a temperature at the at least one filter. The compressed air dryer can alternatively or additionally include an air outlet with at least one replaceable outlet filter, and the compressor failure monitor further monitors a pressure and/or a temperature at the at least one outlet filter.

In embodiments of this invention, a low pressure storage vessel and/or a pressure booster is downstream of the nitrogen generator. The pressure booster is desirably configured to output nitrogen is at a pressure above 4000 psi. The low pressure storage vessel is desirably less than 50 gallons. The pressure booster is desirably configured to pressurize a nitrogen gas within the low pressure storage vessel upon a pressure in the low pressure storage vessel reaching a predetermined pressure. A buffer vessel of less than 50 gallons can be beneficial between the nitrogen generator and the low pressure storage vessel.

The invention further includes a method for generation of nitrogen, including steps of: providing a portable compact unit including a compressed air input, a nitrogen generator configured to receive compressed air from a compressor through the compressed air input, and a nitrogen storage vessel configured to store pressurized nitrogen; and monitoring for compressor failure between a compressed air input and the nitrogen generator. Monitoring for compressor failure can include monitoring for a pressure drop and/or an increased air temperature of the compressed air upstream of the nitrogen generator, wherein the pressure drop or the increased air temperature indicates a compressor failure.

The monitoring can be performed at, such as immediately downstream of, any compressed air filter location upstream of the nitrogen generator. Where the portable compact unit includes a compressed air dryer, including an air inlet with at least one filter, the method can further include monitoring for the pressure drop or the increased air temperature at the at least one filter of the air dryer. When a filter or the desiccant beads in the dryer get saturated with compressor oil, there is a pressure drop. This is monitored at or on the inlet and outlet filters. Also when a compressor is about to fail, or it has a high oil carry over in the air supply, it normally runs hot. Thus inlet air temperature can additionally or alternatively be monitored. Embodiments of this invention include two inlet filters before a desiccant air dryer and one output filter downstream.

A control device includes a monitoring algorithm executable by a data processor which monitors one or more of these inputs in real-time to work out potential oil carry in the air supply. If it is determined that oil is present, the control device shuts the system down and alerts the user, thereby saving the generator. Visual confirmation can be used to prove the oil captured on the filters and preventative action can be taken to fix the air compressor.

Other objects and advantages will be apparent to those skilled in the art from the following detailed description taken in conjunction with the appended claims and drawings.

BRIEF DESCRIPTION OF THE DRAWINGS

FIG. 5 details exemplary nitrogen generation system sizes, according to embodiments of this invention.

DESCRIPTION OF THE INVENTION

The present invention provides a self-contained, small footprint, plug-n-play nitrogen generation system suitable for industrial applications and which can be pre-set to suit the end user's specifications and needs.

Figure 1:
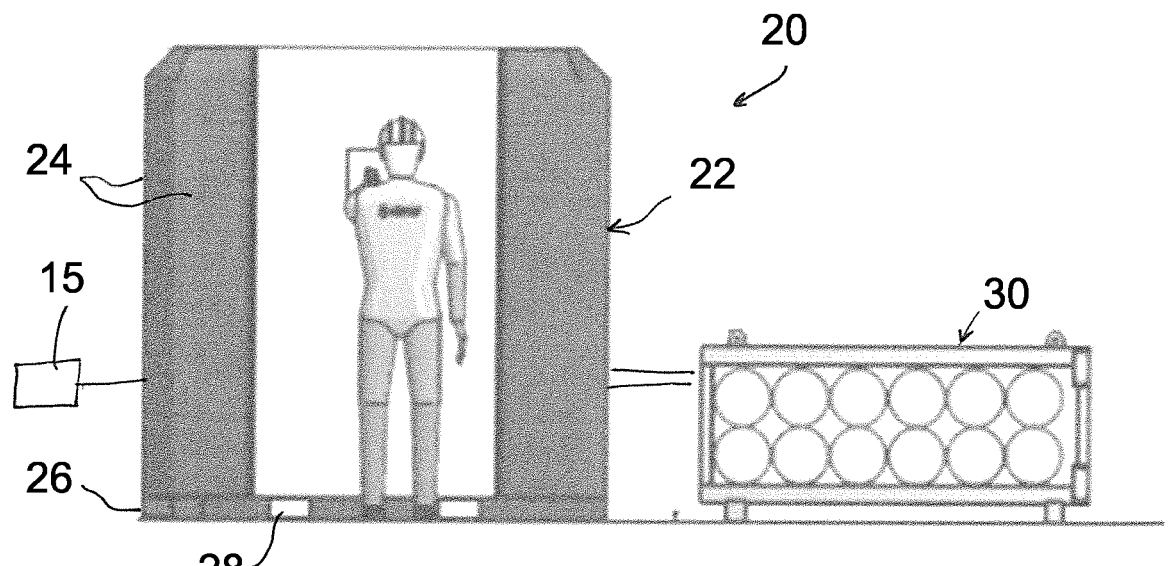
FIG. 1 is a nitrogen generation system according to one embodiment of this invention.
Figure 2:
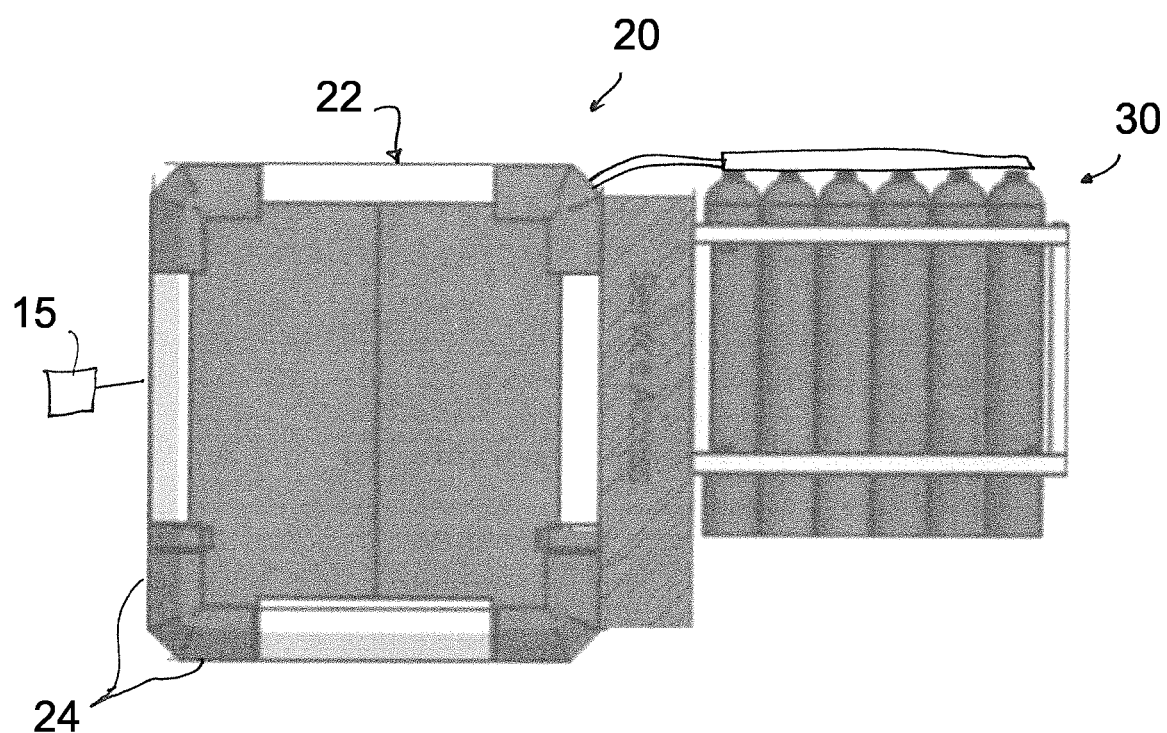
FIG. 2 shows a top view of the nitrogen generation system of FIG. 1.

FIGS. 1 and 2 illustrate a compact, self-contained apparatus 20 for nitrogen generation, according to one embodiment of this invention. FIG. 1 shows an outer enclosure 22, having an optional cube-like configuration, and including four side walls 24 about a floor 26. The floor can include lift openings 28 for receiving a forklift for movement and/or otherwise for cooling airflow purposes. The apparatus 20 is operated via a control panel, to take compressed air from a source 15, such as any suitable compressor, and generate nitrogen. The generated and pressurized nitrogen can be stored internally and/or through add-on multi-cylinder high pressure packs, such as the cylinder pack 30.

Modular high pressure storage according to embodiments of this invention reduces the apparatus 20 footprint, and also allows for future expansion which the customer can install himself. In smaller installations, the cylinder pack 30 can be installed inside the enclosure 22, making for a smaller footprint.

Inbuilt telemetry can be used to reduce the carbon footprint of the systems. Calculating how much standby time is available during generation allows for capture of more nitrogen by adding extra storage. This can be achieved with multi-cylinder high pressure packs, such as the cylinder pack 30 shown in FIGS. 1 and 2. These packs have been designed so they can stack, in a horizontal position, on top of each other, thus providing a reduced floor space footprint while, for example, quadrupling the storage capacity. Current standard high pressure cylinder packs are always vertical and cannot be stacked on top of each other. The number and size of tanks, and the horizontal and vertical size of the stacks can vary, depending on need.

The nitrogen generation apparatus 20 of this invention incorporates components in a functional way that occupies a small footprint, such as only having a length and width of less than 100 inches each, such as desirably occupying a space of 87 in×95 in×87 in, or less. Each apparatus can be tailored to the specific needs (size, pressure, etc.) of the end-user (See, e.g., FIG. 5), allowing them to save money and electricity cost, while reducing a carbon footprint by producing only the purity, flow, and amount of nitrogen actually needed. This represents a big benefit when compared with gas suppliers who deliver high purity nitrogen at an extra cost, when in some cases such purity is not even needed; and compared to storage in large tanks which leads to evaporation of up to 20% of the stored gas.

Figure 3:
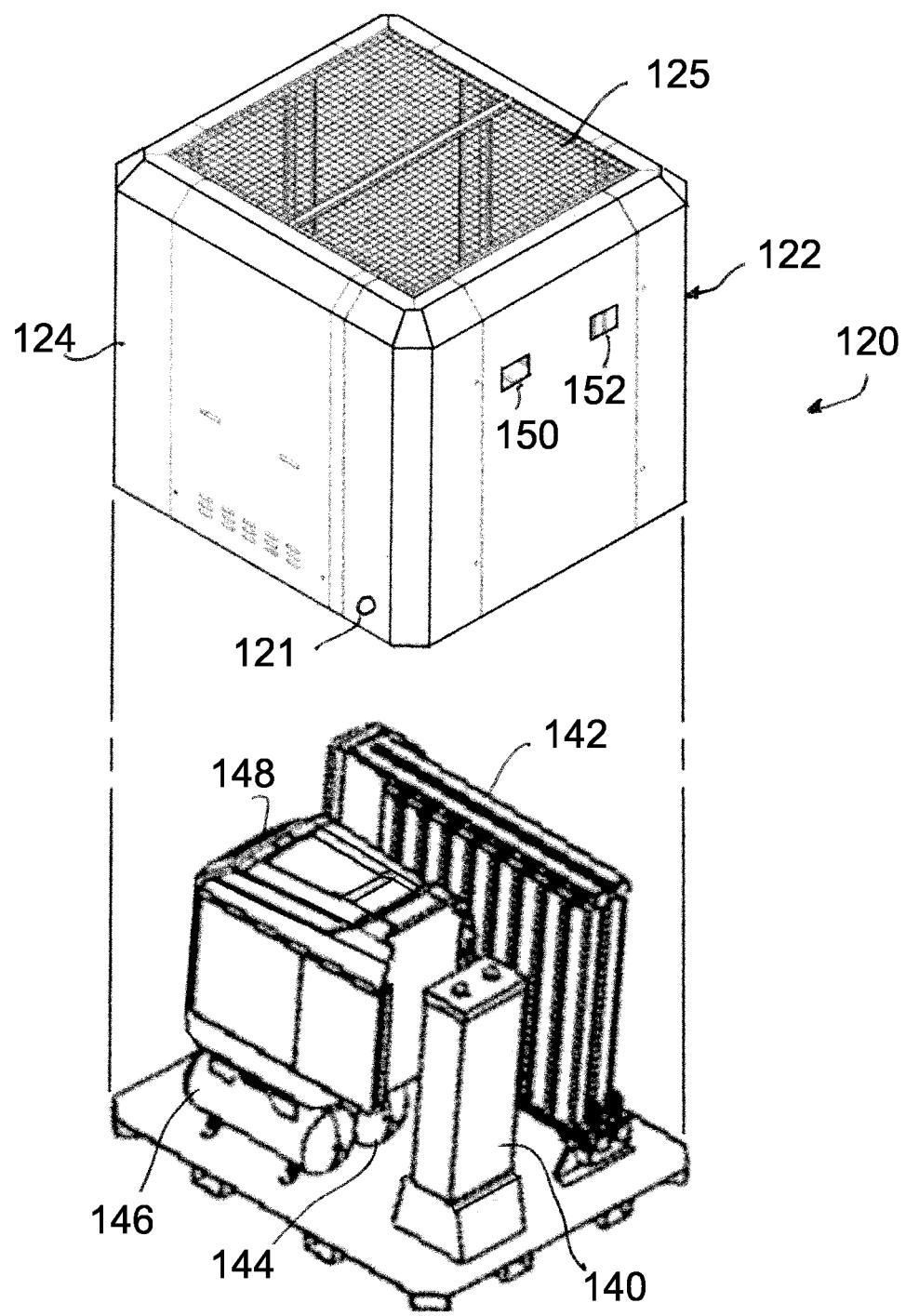
FIG. 3 is a partially exploded perspective view a nitrogen generation system according to one embodiment of this invention.

FIG. 3 shows a compact, self-contained apparatus 120 for nitrogen generation, according to another embodiment of this invention. FIG. 3 shows the outer enclosure 122 removed, but still having the optional cube configuration, and including four side walls 124 about a floor 126. The enclosure 122 includes a semi-open top, such as for ventilation and/or cooling purposes, covered by mesh cover 125.

FIG. 3 shows exemplary internal components. Compressed air is provided to or within the apparatus 120, such as via compressed air inlet 121, and delivered to a dryer 140. Clean dry compressed air from the dryer 140 is supplied, such as at a maximum pressure of 10 bar, to a nitrogen generator 142. The generator 142 cycles the air internally, such as via a pressure swing absorption process, through a carbon molecular sieve and/or a buffer vessel 144 to achieve the required purity level. An exemplary nitrogen generator is a NITROSource® PSA nitrogen gas generator available from Parker Hannifin.

At the desired purity level, the $N_2$ gas is transferred via the generator 142 into a low-pressure storage vessel 146, desirably at pre-set parameters of both pressure and flow. As will be appreciated, the connecting pipe work, which is not illustrated for simplicity, is suitably rated for the intended function.

When the low-pressure vessel 146, acting as a compressor, reaches a set point, such as 87 psi, an $N_2$ booster 148 automatically begins pressurizing the gas internally to deliver the gas to the end-point high-pressure storage until the low-pressure gas pressure drops, for example, to 44 psi. At this point the $N_2$ booster 148 will stop automatically and will only restart when the pre-set psi tank pressure is achieved again. This cycle continues until the high-pressure booster 148 reaches a pre-set maximum storage pressure, preferably and typically about 4,351 psi. The cycle will then stop until pressure through usage drops below the re-start pressure setting. At this point the cycles start again. One or more controller gauges can be accessible on the enclosure 122, such as a generator gauge 150 and a booster gauge 152.

Embodiments of the invention provide a footprint that is, for example, less than 30% of the equivalent generators producing the same flow, purity, pressure and storage volume. This benefit is provided, at least in part, by control and managing of timing cycles and/or the size of the storage vessels. The invention can provide storage vessels that are a tenth of the size of what the nitrogen generators manufacturers typically recommend.

Manufacturers of current nitrogen generators often recommend buffer and low pressure tanks typically of a size of about 400 gallon. These would be larger than the entire apparatus in FIG. 3. The invention miniaturizes the necessary tanks and still gets optimum performance, such as with tanks 144 and/or 146 that are less than 50 gallons, such as 40 gallon tanks which are ⅒th of the current recommended sizes. This is achieved by controlling the pressure and flow into the nitrogen booster and managing the on/off cycles with the control system.

Figure 4:
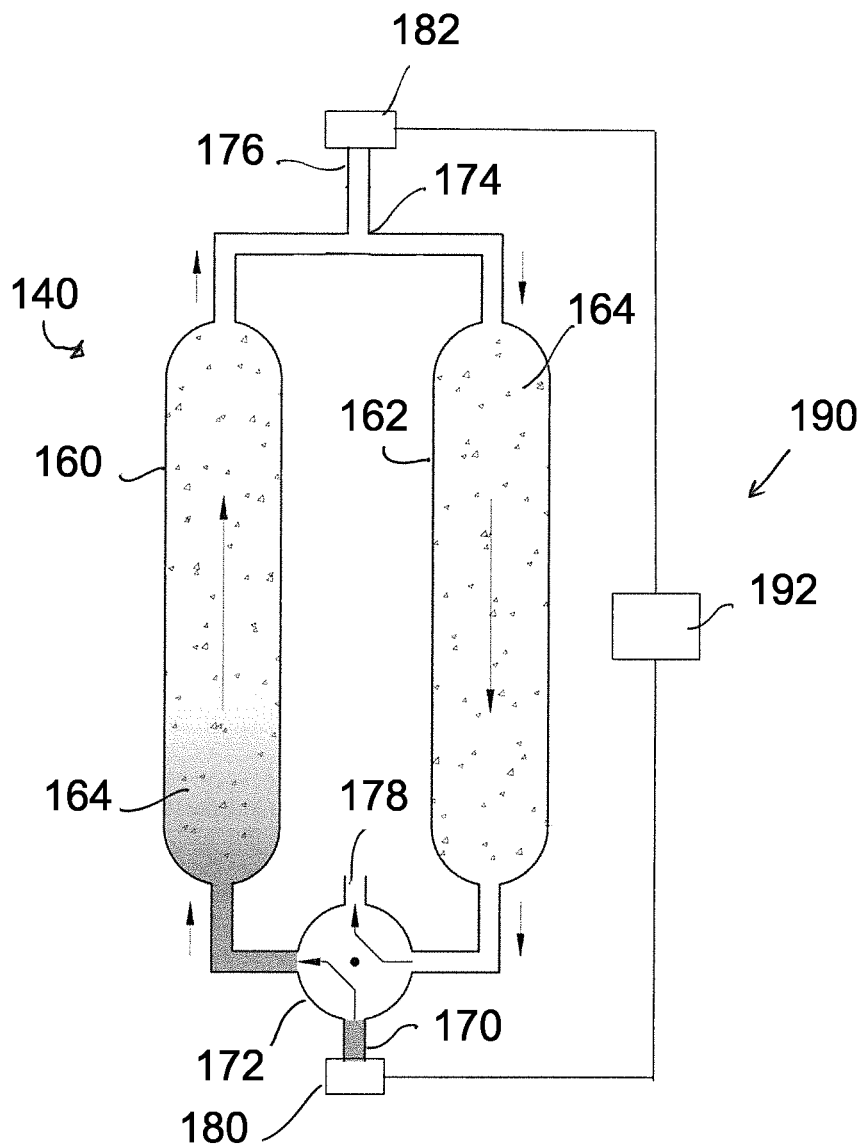
FIG. 4 is a schematic of an air dryer and monitoring system according to one embodiment of this invention.

FIG. 4 shows an exemplary schematic for air dryer 140 according to one embodiment of this invention. Air dryer 140 is shown as a desiccant air dryer having a drying tower 160 and a regenerating tower 162. Desiccant 164 travels a cycle, indicated by arrows, through the towers 160 and 162 for removing moisture from the compressed air. Each tower 160 and 162 can be associated with one or more heaters (not shown) for operation. Compressed air enters through the air inlet 170, and passes lower diverter valve 172 into the drying tower 160. An upper diverter valve 174 allows dry air to pass on though outlet 176, while moisture-laden desiccant 164 passes to the regeneration tower 162. Moisture is expelled at vent 178.

In embodiments of this invention, there is at least one filter at one or more of the air inlet 170 and the air outlet 176. As shown, inlet filter 180 and outlet filter 182 are each connected to a compressor failure monitor 190. Sensors at one or both of the inlet/outlet or the respective filter, measure the pressure and/or temperature at these positions. When a filter or the desiccant beads in the dryer gets saturated with oil, there is a pressure drop. Also when a compressor is about to fail or it has a high oil carry over in the air supply it normally runs hot. The controller 192 monitors these filter positions for pressure and/or temperature changes, and compares then measurements to predefined values. The generator apparatus can be shut down when the controller determines a possible compressor issue. Visual confirmation can prove any oil captured on the filters and preventative action can be taken to fix the air compressor. This saves the high costs of damage and potential downtime because excessive oil in the air supply damages the carbon molecular sieve, etc. in the nitrogen generators beyond repair. Changing the parts is not just very expensive but also time consuming resulting in massive downtime and nitrogen replacement costs.

In additional embodiments of this invention, output delivery gas is regulated by an $N_2$ compliant regulator pre-set to customer requirements, usually a 406 psi maximum. Furthermore, when all maximum pressures are met, if there is no call for usage the equipment will go into a standby mode until gas is required. Other embodiments include remote diagnostic applications able to monitor systems from the office or anywhere where there is a Wi-Fi signal. The invention further includes a control module or system that operates the components and communicate with the components, such as for example, via MODBUS.

Thus, the invention provides a space-efficient nitrogen generator for industrial processes such as laser cutting. The invention avoids the inefficiency of gas delivery and tank storage, and provide a compact footprint over existing systems. The invention can further be implemented in various sizes and configurations, such as illustrated in the table of FIG. 5.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for nitrogen production from air, the apparatus comprising a portable compact unit including a compressed air input configured to connect to a compressor, a nitrogen generator configured to receive compressed air from the compressor through the compressed air input and to generate nitrogen from the compressed air, a nitrogen storage vessel configured to store pressurized nitrogen from the nitrogen generator, and a compressor failure monitor disposed between the compressed air input and the nitrogen generator.

2. The apparatus of claim 1, wherein a bottom footprint of the portable compact unit comprises a longest length or width dimension of less than 100 inches.

3. The apparatus of claim 1, wherein the compressor failure monitor monitors a pressure or a temperature of the compressed air upstream of the nitrogen generator.

4. The apparatus of claim 3, wherein a pressure drop or a temperature increase indicates a compressor failure.

5. The apparatus of claim 1, further comprising a compressed air dryer between the compressed air input and the nitrogen generator, wherein the compressor failure monitor is in detection combination with the compressed air dryer.

6. The apparatus of claim 5, wherein a pressure drop or a temperature increase at the air dryer indicates a compressor failure.

7. The apparatus of claim 5, wherein the compressed air dryer comprises an air inlet with at least one filter, and the compressor failure monitor monitors a pressure or a temperature at the at least one filter.

8. The apparatus of claim 7, wherein a pressure drop or a temperature increase at the at least one filter indicates a compressor failure.

9. The apparatus of claim 7, wherein the compressed air dryer comprises an air outlet with at least one outlet filter, and the compressor failure monitor further monitors a pressure or a temperature at the at least one outlet filter.

10. The apparatus of claim 1, further comprising a low pressure storage vessel and a pressure booster downstream of the nitrogen generator.

11. The apparatus of claim 10, wherein the pressure booster is configured to output nitrogen is at a pressure above 4000 psi.

12. The apparatus of claim 11, wherein the low pressure storage vessel is less than 50 gallons.

13. The apparatus of claim 11, further comprising a buffer vessel of less than 50 gallons between the nitrogen generator and the low pressure storage vessel.

14. The apparatus of claim 11, wherein the pressure booster is configured to pressurize a nitrogen gas within the low pressure storage vessel upon a pressure in the low pressure storage vessel reaching a predetermined pressure.

15. An apparatus for nitrogen production from air, the apparatus comprising:
- a portable compact unit including a compressed air input, an air dryer configured to receive compressed air from a compressor through the compressed air input, a nitrogen generator configured to receive the compressed air from the air dryer and generate nitrogen from the compressed air, and a nitrogen storage vessel configured to store pressurized nitrogen from the nitrogen generator; and
- a compressor failure monitor in combination with the air dryer, wherein the compressor failure monitor is configured to monitor an air pressure or an air temperature at or from the air dryer.

16. A method for generation of nitrogen, comprising:
providing a portable compact unit including a compressed air input, a nitrogen generator configured to receive compressed air from a compressor through the compressed air input and generate nitrogen from the compressed air, and a nitrogen storage vessel configured to store pressurized nitrogen from the nitrogen generator; and
monitoring for compressor failure between a compressed air input and the nitrogen generator.

17. The method of claim 16, wherein monitoring for compressor failure comprises monitoring for a pressure drop or an increased air temperature of the compressed air upstream of the nitrogen generator, wherein the pressure drop or the increased air temperature indicates a compressor failure.

18. The apparatus of claim 17, wherein the portable compact unit comprises a compressed air dryer including an air inlet with at least one filter, and further comprising monitoring for the pressure drop or the increased air temperature at the at least one filter.

* * * * *